(12) United States Patent
Faibish et al.

(10) Patent No.: US 7,444,662 B2
(45) Date of Patent: Oct. 28, 2008

(54) VIDEO FILE SERVER CACHE MANAGEMENT USING MOVIE RATINGS FOR RESERVATION OF MEMORY AND BANDWIDTH RESOURCES

(75) Inventors: Sorin Faibish, Newtown, MA (US);
John Forecast, Newtown, MA (US);
Ugur Sezer, Shrewsbury, MA (US);
Peter Bixby, Westborough, MA (US);
Wayne W. Duso, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 1641 days.

(21) Appl. No.: 09/893,825

(22) Filed: Jun. 28, 2001

(65) Prior Publication Data
US 2003/0005457 A1    Jan. 2, 2003

(51) Int. Cl.
*H04N 7/173* (2006.01)
(52) U.S. Cl. ............... 725/91; 725/92; 725/93; 725/96; 711/100; 711/133; 709/214; 709/217; 709/219
(58) Field of Classification Search ............. 725/91–95; 711/100, 133; 709/214, 217, 219, 229
See application file for complete search history.

(56) References Cited

U.S. PATENT DOCUMENTS

| | | | |
|---|---|---|---|
| 5,381,539 A | 1/1995 | Yanai et al. | 395/425 |
| 5,544,313 A * | 8/1996 | Shachnai et al. | 725/92 |
| 5,586,264 A * | 12/1996 | Belknap et al. | 725/116 |
| 5,629,732 A * | 5/1997 | Moskowitz et al. | 725/102 |
| 5,630,067 A | 5/1997 | Kindell et al. | 395/200.09 |
| 5,636,139 A * | 6/1997 | McLaughlin et al. | 709/219 |
| 5,774,660 A | 6/1998 | Brendel et al. | 395/200.31 |
| 5,774,714 A * | 6/1998 | Thapar et al. | 707/100 |

(Continued)

FOREIGN PATENT DOCUMENTS

WO    WO 200060861 A1 * 10/2000

(Continued)

OTHER PUBLICATIONS

Neufeldt, Victoria; Webster's New World Dictionary of American English; 1988; Prentice Hall Trade; Third College Edition; p. 1112.*

(Continued)

*Primary Examiner*—John W. Miller
*Assistant Examiner*—Farzana E Hossain
(74) *Attorney, Agent, or Firm*—Richard C. Auchterlonie; Novak Druce & Quigg, LLP

(57) ABSTRACT

Access to movies ranging from very popular movies to unpopular movies is managed by configuring sets of data movers for associated movie rankings, reserving data mover local cache resources for the most popular movies, reserving a certain number of streams for popular movies, negotiating with a client for selection of available movie titles during peak demand when resources are not available to start any freely-selected movie in disk storage, and managing disk bandwidth and primary and local cache memory and bandwidth resources for popular and unpopular movies. The assignment of resources to movie rankings may remain the same while the rankings of the movies are adjusted, for example, during off-peak hours. A movie locked in primary cache and providing a source for servicing a number of video streams may be demoted from primary cache to disk in favor of servicing one or more streams of a higher-ranking movie.

22 Claims, 16 Drawing Sheets

U.S. PATENT DOCUMENTS

| | | | | |
|---|---|---|---|---|
| 5,787,472 | A * | 7/1998 | Dan et al. | 711/134 |
| 5,790,935 | A * | 8/1998 | Payton | 725/91 |
| 5,815,662 | A * | 9/1998 | Ong | 725/92 |
| 5,829,046 | A * | 10/1998 | Tzelnic et al. | 711/162 |
| 5,892,535 | A * | 4/1999 | Allen et al. | 725/36 |
| 5,892,915 | A * | 4/1999 | Duso et al. | 709/219 |
| 5,916,303 | A * | 6/1999 | Scott | 709/217 |
| 5,935,206 | A * | 8/1999 | Dixon et al. | 709/219 |
| 5,936,659 | A * | 8/1999 | Viswanathan et al. | 725/103 |
| 5,944,789 | A | 8/1999 | Tzelnic et al. | 709/214 |
| 6,018,359 | A * | 1/2000 | Kermode et al. | 725/101 |
| 6,115,740 | A * | 9/2000 | Mizutani | 709/217 |
| 6,128,701 | A * | 10/2000 | Malcolm et al. | 711/133 |
| 6,167,496 | A * | 12/2000 | Fechner | 711/168 |
| 6,170,006 | B1 * | 1/2001 | Namba | 709/217 |
| 6,324,581 | B1 * | 11/2001 | Xu et al. | 709/229 |
| 6,401,126 | B1 * | 6/2002 | Douceur et al. | 709/231 |
| 6,442,651 | B2 * | 8/2002 | Crow et al. | 711/118 |
| 6,453,354 | B1 * | 9/2002 | Jiang et al. | 709/229 |
| 6,721,794 | B2 * | 4/2004 | Taylor et al. | 709/231 |
| 6,816,891 | B1 * | 11/2004 | Vahalia et al. | 709/214 |
| 6,868,452 | B1 * | 3/2005 | Eager et al. | 709/231 |
| 7,028,096 | B1 * | 4/2006 | Lee | 709/231 |
| 2002/0157113 | A1 * | 10/2002 | Allegrezza | 725/115 |
| 2003/0041280 | A1 * | 2/2003 | Malcolm et al. | 714/4 |
| 2004/0261112 | A1 * | 12/2004 | Hicks et al. | 725/89 |
| 2005/0071882 | A1 * | 3/2005 | Rodriguez et al. | 725/95 |

OTHER PUBLICATIONS

"Zipf Curves and Website Popularity", http://www.useit.com/alertbox/zipf.html, Jun. 14, 2001, 2 pages.

"Delivering on the Promise of Internet Streaming Media", Oct. 2000, CacheFlow Inc. v1.0, Sunnyville, CA, pp. 1-15.

"Streaming Media Optimization with CacheFlow Internet Caching Appliances", CacheFlow, Inc., Sunnyville, CA, http://www.cacheflow.com/technology/whitepapers/streaming.cfm, Jun. 11, 2001, pp.1-5.

P. Venkat Rangan and Harrick M. Vin, "Designing File Systems for Digital Video and Audio", Multimedia Laboratory, University Of Califonia, Dept. of Computer Science and Engineering, La Jolla, CA, 1991, pp. 81-94.

Huanxu Pan, Lek heng Ngoh and Aurel A. Lazar, "A Time-Scale Dependent Disk Scheduling Scheme for Multimedia-on-Demand Servers," 1996 IEEE, New York, NY, pp. 572-579.

Divyesh Jadav, Chutimet Srinila, Alok Choudhary, P. Bruce Berra, "Design and Evaluation of Data Access Strategies in a High Performance Multimedia-on-Demand Server," 1995 IEEE, Syracuse, NY, pp. 286-291.

David C. Steere, James J. Kistler, M. Satyanarayanan, "Efficient User-Level File Cache Management on the Sun Vnode Interface", Usenix Summer Congerence, Jun. 11-15, 1990, Anaheim, California, pp. 325-331.

David P. Anderson, Yoshitomo Osawa and Ramesh Govindan, "A File System for Continuous Media," Transactions On Computer Systems, Nov. 1992, vol. 10, No. 4, pp. 311-337.

* cited by examiner

| MOVIE RANKING | DATA MOVER SET |
|---|---|
| 1 | SET 1 ≡ {DM1, DM2, DM3} |
| 2 | SET 2 ≡ {DM3, DM4} |
| 3 | SET 3 ≡ {DM5} |
| 4 | SET 3 ≡ {DM6} |
| 5 | SET 4 ≡ {DM7} |
| 6 | SET 4 ≡ {DM7} |
| 7 | SET 5 ≡ {DM8} |
| 8 | SET 5 ≡ {DM8} |
| ⋮ | ⋮ |

| Movie Ranking | Movie Title | Frequency Of Access | Data Mover Set | No. of Reserved Video Streams | No. of Active Video Streams | Location On Disk | Any Location In Cache |
|---|---|---|---|---|---|---|---|
| 1 | --- | 25,000 | 1 | 5,000 | 3,497 | --- | --- |
| 2 | --- | 11,000 | 2 | 2,200 | 1,738 | --- | --- |
| 3 | --- | 7,900 | 3 | 1,580 | 2,300 | --- | --- |
| 4 | --- | 6,900 | 3 | 1,380 | 790 | --- | --- |
| 5 | --- | 4,000 | 4 | 800 | 570 | --- | --- |
| 6 | --- | 2,600 | 4 | 520 | 640 | --- | --- |
| 7 | --- | 2,300 | 4 | 460 | 198 | --- | --- |
| 8 | --- | 2,000 | 4 | 400 | 340 | --- | --- |
| 9 | --- | 1,700 | 5 | 340 | 270 | --- | --- |

FIG. 5

AVAILABLE STREAMS FROM
DATA MOVER SET

| RESERVED | NOT RESERVED |
|---|---|

| ACTIVE | INACTIVE |
|---|---|

FIG. 6

| BANDWIDTH ON STORAGE SYSTEM BUS | | |
|---|---|---|
| BANDWIDTH FOR ACCESS OF MOVIES FROM PRIMARY CACHE | BANDWIDTH FOR ACCESS OF MOVIES FROM DISK | FREE BANDWIDTH |

FIG. 7

| PRIMARY CACHE MEMORY CAPACITY | | |
|---|---|---|
| CACHE LOCKED FOR FOR ACCESS OF ENTIRE MOVIES IN CACHE | CACHE LOCKED FOR BUFFERING OF DISK ACCESS | FREE CACHE MEMORY |

FIG. 8

PRIMARY CACHE LOCKED FOR ACCESS OF ENTIRE MOVIE IN CACHE

| M1 | M2 | ... | ML |
|---|---|---|---|
| t1 | t2 | | tL |

FIG. 9

AVAILABILITY OF MOVIE TITLES

SHOW AVAILIABILITY OF THE MOVIE TITLED:
_____(MOVIE TITLE SUPPLIED BY CLIENT)_____

LISTING IN RANK ORDER OF ACCESS AT ANY TIME MOVIES WITH FULL VCR CAPABILITY

LISTING IN RANK ORDER OF MOVIES SCHEDULED TO START IN NEXT 15 MINUTES

LISTING IN RANK ORDER OF MOVIES SCHEDULED TO START IN NEXT 30 MINUTES

LISTING IN RANK ORDER OF MOVIES SCHEDULED TO START IN NEXT 105 MINUTES

SHOW LISTING IN RANK ORDER OF MOVIES CURRENTLY PLAYING

SHOW LISTING OF OTHER MOVIE TITLES IN DISK STORAGE

SHOW LISTING OF ALL MOVIE TITLES IN ARCHIVE STORAGE

VIDEO FILE SERVER CACHE MANAGEMENT USING MOVIE RATINGS FOR RESERVATION OF MEMORY AND BANDWIDTH RESOURCES

BACKGROUND OF THE INVENTION

1. Field of the Invention

The present invention relates generally to video file servers and more particularly to a video file server providing "video on demand" (VOD) service. In particular, the present invention relates to management of cache memory and bandwidth resources in such a video file server.

2. Description of the Related Art

To provide "video on demand" (VOD) service, a multiplicity of digitally-encoded movies are stored in an array of disk drives, and the disk drives are coupled to a data network for delivery of the movies to network clients for viewing. It is desired to permit each client to select any one of the movies in the disk storage for viewing at any time, and to give the client "video cassette recorder" (VCR) functionality permitting the client to pause and fast-forward or fast-reverse to any location in the movie while viewing the movie.

Video file servers are typically constructed using disk drives, network interfaces, and other components that have been designed and manufactured for general data storage and network computing applications. For example, one architecture for a video file server includes a cross-bar switch to couple an array of conventional disk drives to an array of network interface circuits. In this architecture, it is possible for any network client communicating with any one of the network interface circuits to access any movie in any one of the disk drives. This architecture, however, has a disk drive bandwidth limitation preventing more than a certain number of independent real-time video streams to issue from any one of the disk drives. This bandwidth limitation is problematic for providing video-on-demand service for the more popular movies. The bandwidth limitation can be overcome by storing a complete copy of each of the more popular movies in more than one of the disk drives, but such a solution is very costly. A more economical solution is to deny VCR functionality for the most popular movies, and instead offer the most popular movies starting at various increments of time and continuing without interruption. For example, if each disk drive has sufficient bandwidth to supply eight concurrent-time video streams, then it is possible for the one disk drive containing only one two-hour movie to permit any client to begin viewing at the start of the movie every fifteen minutes. Each of the eight video streams could be simulcast to any number of the clients that could be serviced concurrently by all of the network interface circuits.

Another architecture for a video file server is a hierarchical architecture that uses a cached disk storage system and network interface circuits in a multiplicity of commodity computers. The cached disk storage system includes a primary cache memory, and each commodity computer includes a local secondary cache memory. Each cache memory provides a much higher available bandwidth than a single disk drive. Therefore, it is possible to store an entire movie in cache memory to provide the network clients with VOD and VCR access to the movie. An example of such a hierarchical video file server is described in Duso et al. U.S. Pat. No. 5,892,915 issued Apr. 6, 1999, incorporated herein by reference. Such a video file server is manufactured and sold by EMC Corporation, 35 Parkwood Drive, Hopkinton, Mass. 01748.

Although Duso et al. U.S. Pat. No. 5,892,915 teaches how to make a video file server that can provide VOD and VCR access to the most popular movies and also unpopular movies, there is a need for more efficient management of access to popular movies that are not sufficiently popular to always keep them in cache memory. Moreover, the popularity of a movie will change with time, and therefore it is desired for the video file server to manage cache memory and bandwidth in accordance with the changing popularity of the movie.

SUMMARY OF THE INVENTION

In accordance with one aspect, the present invention provides a video file server for providing clients with video-on-demand access to movies. The video file server includes a cached disk storage system including a primary cache memory and disk storage for storing the movies; and a multiplicity of data mover computers coupled to the cached disk storage system for streaming video data from the cached disk storage system to clients in a data network. Each of the data mover computers has a local cache memory. The movies are ranked with respect to popularity, and a respective set of the data movers are pre-assigned for servicing video streams for each movie ranking.

In accordance with another aspect, the invention provides a video file server for providing clients with video-on-demand access to movies. The video file server comprises a cached disk storage system including a cache and disk storage for storing the movies; and a multiplicity of data mover computers coupled to the cached disk storage system for streaming video data from the cached disk storage system to clients in a data network. The video file server is programmed for locking in the cache a plurality of entire movies, and when there is a need for servicing a more popular movie from the cache and there is insufficient free cache memory for servicing the more popular movie from the cache, transferring the servicing of a less popular movie from the cache to disk storage in order to free cache memory for servicing the more popular movie from the cache.

In accordance with yet another aspect, the invention provides a method of operating a video file server for providing clients with video-on-demand access to movies. The video file server has a cached disk storage system including a primary cache and disk storage containing the movies, and a multiplicity of data mover computers coupled to the cached disk storage system for streaming video data from the cached disk storage system to clients in a data network. Each of the data mover computers has a local cache. The method includes ranking the movies with respect to popularity, and assigning a respective set of the data movers to each movie ranking, and servicing video streams for each movie ranking with the respective set of data movers assigned for servicing said video streams for said each movie ranking.

In accordance with still another aspect, the invention provides a method of operating a video file server for providing clients with video-on-demand access to movies. The video file server has a cached disk storage system including a cache and disk storage containing the movies, and a multiplicity of data mover computers coupled to the cached disk storage system for streaming video data from the cached disk storage system to clients in a client data network. The method includes locking in the cache a plurality of entire movies, and when there is a need for servicing a more popular movie from the cache and there is insufficient free cache memory for servicing the more popular movie from the cache, transferring the servicing of a less popular movie from the cache to the disk storage in order to free cache memory for servicing the more popular movie from the cache.

BRIEF DESCRIPTION OF THE DRAWINGS

Other objects and advantages of the invention will become apparent upon reading the following detailed description with reference to the drawings, in which:

FIG. 5 shows an example of a portion of the service database in the control station associating certain information with the movies;

FIG. 6 shows an allocation of reserved and not reserved streams, and active and inactive streams from a data mover set;

FIG. 7 shows an allocation of bandwidth on the storage system bus;

FIG. 8 shows an allocation of primary cache memory capacity;

FIG. 9 shows a number of entire movies locked in the primary cache;

FIG. 10 shows various ways of indicating to a client the availability of movie titles during a high demand situation;

Figure 1:
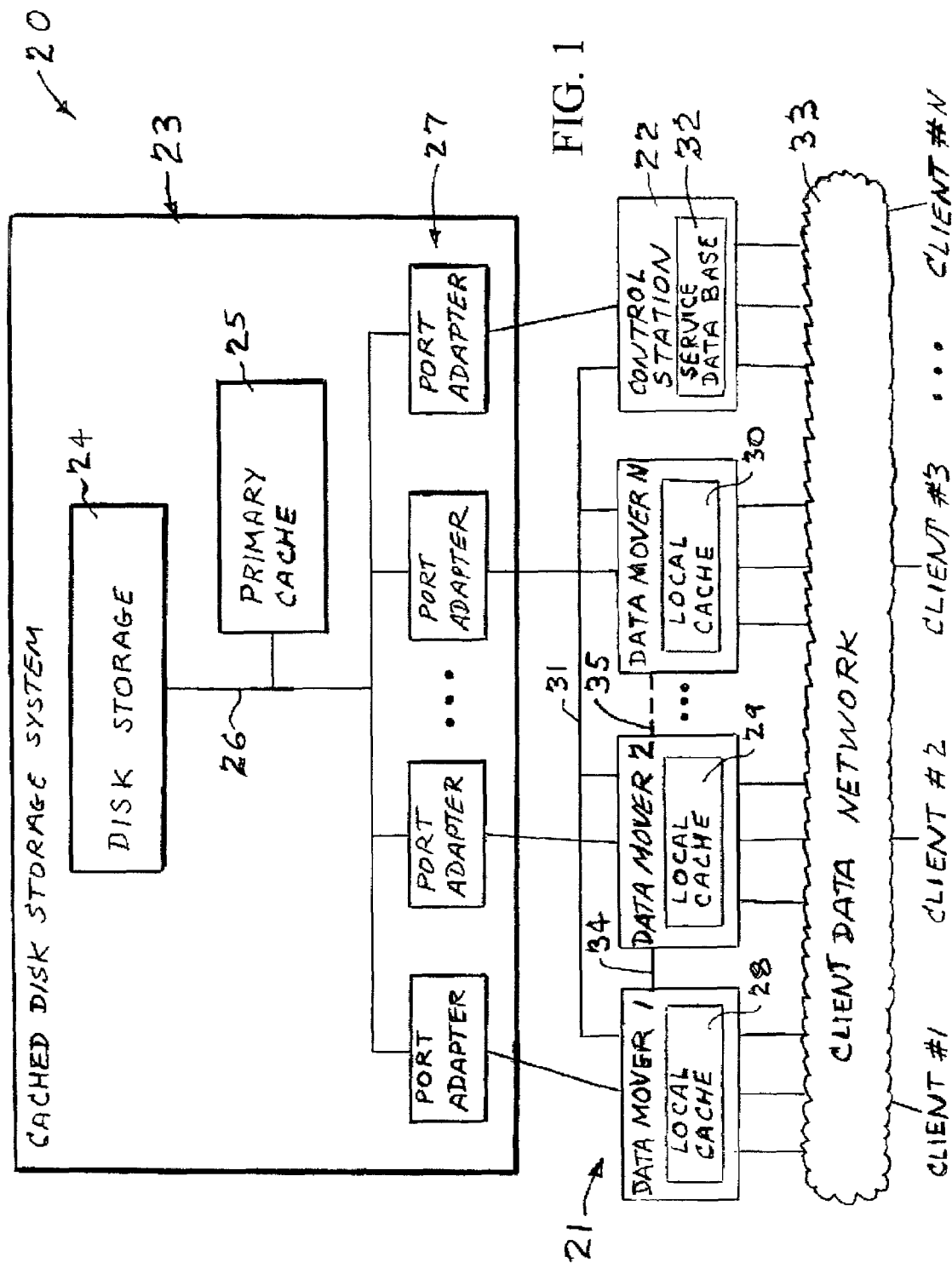
FIG. 1 is a block diagram of a hierarchical video file server incorporating the present invention.

While the invention is susceptible to various modifications and alternative forms, specific embodiments thereof have been shown by way of example in the drawings and will be described in detail. It should be understood, however, that it is not intended to limit the invention to the particular forms disclosed, but on the contrary, the intention is to cover all modifications, equivalents, and alternatives falling within the scope of the invention as defined by the appended claims.

DESCRIPTION OF ILLUSTRATIVE EMBODIMENTS

With reference to FIG. 1, of the drawings, there is shown a video file server generally designated 20 incorporating the present invention. The video file server 20 includes an array of data mover computers 21, at least one control station computer 22, and a cached disk storage system 23. The video file server 20 is a high performance, high capacity, and high-availability network-attached data server. It provides the ability for multiple file systems to exist concurrently over multiple communication stacks, with shared data access. It also allows multiple physical file systems to co-exist, each optimized to the needs of a particular data service.

The video file server 20 is managed as a dedicated network appliance, integrated with popular network operating systems in a way, which, other than its superior performance, is transparent to the end user. It provides specialized support for isochronous data streams used in live, as well as store-and forward, audio-visual applications. Therefore, the video file server 20 is suitable for a wide variety of applications such as image repositories, video on demand, and networked video applications, in addition to high-end file server applications.

The cached disk storage system 23 includes disk storage 24 in the form of an array of small commodity disk drives. The cached disk storage system 23 also includes a high-capacity random access cache memory 25. The disk storage 24 and the cache memory 25 share a system bus 26. The cached disk storage system 23 also includes a number of port adapters 27, and each of the data mover computers 21 and the control station computer 22 is linked to the system bus 26 by at least one of the port adapters.

Each of the data movers 21 is a high-end commodity computer. The clustering of the data movers 21 as a front end to the cached disk storage system 23 provides parallelism and scalability. Each of the data mover computers 21 includes a respective local cache 28, 29, 30 of random access memory. The local caches function as a very large capacity secondary cache, and the cache 25 in the cached disk storage system 23 functions as a primary cache, in a hierarchical storage architecture.

For real-time streaming of movie data, the storage and access of the movie data in the cache memory is scheduled by the control station 22 in accordance with an admission control protocol. The control station 22 is linked to the data movers 21 by a dual-redundant high-speed internal Ethernet network 31. The control station 22 responds to a client request for the real-time streaming of movie data by checking whether or not the video file server has sufficient memory and bandwidth resources to guarantee that when a request is granted, the real-time streaming can continue without interruption until the end of the movie. The resources currently in use and the resources available are noted in a service data base 32 maintained in local memory of the control station 22 and backed-up in the disk storage 24. If there are sufficient resources, then the control station 22 places locks on the required resources, grants the client's request, and maintains the locks until the client's request is satisfied. For example, the control station 22 may determine that a video stream can be serviced by pre-fetching the movie data from the disk storage 24 and buffering the data through the primary cache 25 and one of the data mover local caches 28, 29, 30. In this case, the control station 22 will select one of the data movers to service the client request, and will place a lock upon certain bandwidth and cache memory resources of the selected data mover, and will also place a lock on bandwidth resources of the system bus 26 and memory resources of the primary cache 25, and these locks will remain in place until the selected data mover is finished streaming video data to the client.

Further details regarding the construction and operation of a video file server are found in Duso et al. U.S. Pat. No. 5,892,915 issued Apr. 6, 1999, incorporated herein by reference. For practicing the present invention, the video file server 20 is programmed as further described below. In addition, the physical configuration of the data movers may also be modified as described below with reference to FIG. 4. These modifications provide more efficient management of access to popular movies that are not sufficiently popular to always keep them in cache memory.

Proper management of cache memory in the video file server of FIG. 1 is important for effective use of the bandwidth resources in the video file server of FIG. 1. FIG. 1 has been drawn to emphasize the hierarchical architecture of the file server. At the top of the hierarchy, at the disk storage level, the bandwidth resources are at a minimum. At the bottom of the hierarchy, at the data mover interface to the client data network 33, the bandwidth resources are at a maximum. The increased bandwidth resources at the bottom of the hierarchy can be fully used only if the same data from the disk storage 24 at the top of the hierarchy is being streamed to multiple clients at the bottom of the hierarchy. Unless the same data is being multicast from the disk storage 24 to the multiple clients, it must be streamed from cache memory, and there must be a balance between the increased bandwidth resources at the bottom of the hierarchy and the cache memory capacity of the primary cache 25 and the data mover local cache memories 28, 29, and 30.

For a few of the most popular movies, an entire movie can be kept in the local cache of one or more of the data movers 21. For unpopular movies, there is no advantage to keeping an entire movie in cache because it is most likely that the limited number of clients simultaneously viewing the movie can be supported by streaming the video data directly from one disk drive containing the movie. Between these two extremes, however, there are a substantial number of rather popular movies that should be serviced from cache in an appropriate fashion to satisfy client demands for VOD and VCR service.

It is possible to configure the hardware of the video file server 20 for effective service of all kinds of movies due to a certain regularity in the frequency of access of movies once the movies have been ranked in terms of their frequency of access. Shown in FIG. 2, for example, is an idealized plot of the frequency of access, in plays per day, as a function of the ranking of each movie accessible from the video file server. The most popular movie is given a rank of one, the next most popular movie is given a rank of 2, and so on. When plotted on log-log paper, the plot falls on a straight line with negative slope in accordance with the "Zipf" distribution. (See, for example, the Jakob Nielsen, "Zipf Curves and Website Popularity," published on the Internet at the "useit.com" web site). Although the popularity of each movie may rise and will fall with time, the plot will retain its general characteristic of a line having a certain slope and intercept with the "y" axis. Therefore, it is possible to configure and program the video file server in accordance with the general characteristic, in order to handle effectively each movie ranking. Moreover, the video file server can be configured and programmed initially without regard to the rank of any particular movie.

When a movie is first released for VOD distribution, it will have an industry rating, such as the "Blockbuster" rating, with respect to other popular movies. Therefore, the newly released movie can be ranked with respect to the popular movies already stored in the video file server, and the rank of each lower rated movie in the video file server can be decreased by one level as the newly released movie is written to disk storage of the video file server. New movie releases, for example, are written into the disk storage at the time of day of minimum demand, for example, about 3:00 a.m. Each day, the number of accesses for each movie is recorded to compute a running average of the frequency of access of each movie, in order to re-adjust the rank of each movie, and make effective the adjusted rank at the time of day of minimum demand.

Figures 2, 3:
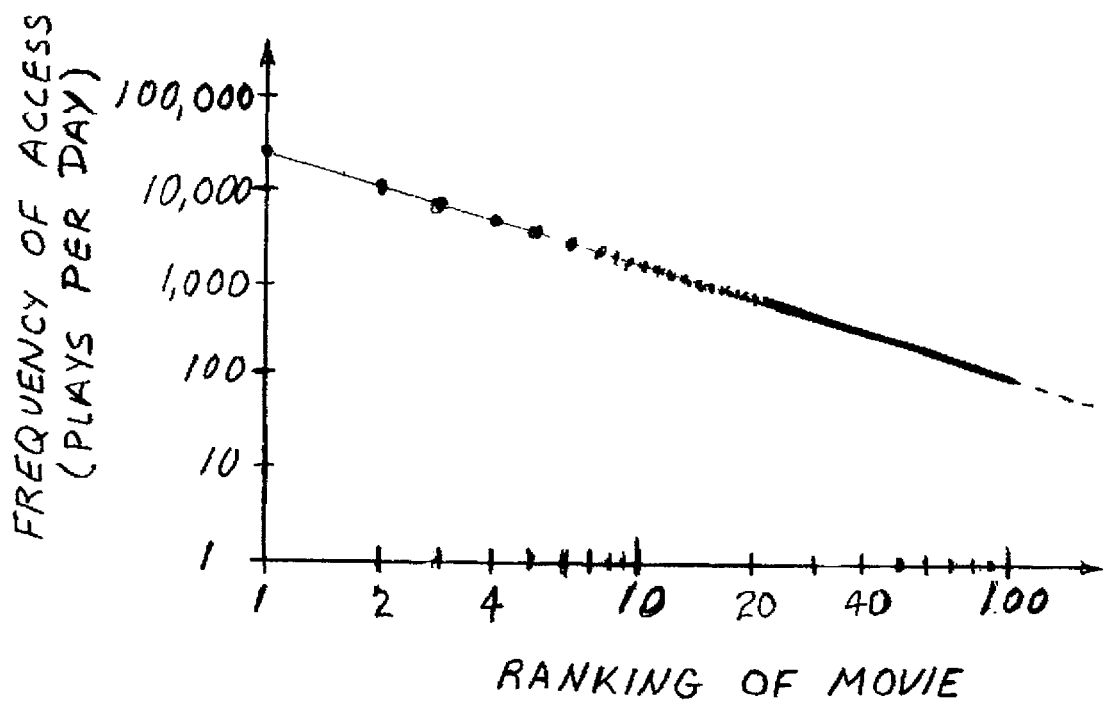
FIG. 2 is a graph of frequency of access in plays per day versus the ranking of movies stored in the video file server of FIG. 1.
FIG. 3 is a table showing a correspondence between the movie ranking and a data mover set aside for servicing client requests for access to the movie.

In accordance with one aspect of the present invention, for each movie ranking, a particular set of data mover resources are preassigned for servicing client access to the movie having the movie ranking. With reference to FIG. 3, for example, there is shown a table associating each movie ranking with a data mover set pre-assigned to service the movie having the associated ranking. Therefore, there is a certain maximum number of video streams that are available to each movie, corresponding to the total number of video streams that all of the data movers in the set can supply to the client data network. There is also a certain maximum amount of data mover local cache memory capacity available for servicing each movie, corresponding to the total amount of local cache memory in all of the data movers in the set.

For the highest ranked movie (i.e., the most popular movie having the lowest numerical rank value), the data mover set may include a multiplicity of data movers, in order to support a large number of concurrent video streams. For the lowest ranked movies (i.e., unpopular movies), the same data mover set consisting of a single data mover may service a multiplicity of movies. The data mover sets need not be disjoint, and instead there may be overlap between the data mover set servicing one movie ranking and the data mover set servicing the movie ranking having the next higher or lower rank. The overlap may facilitate the process of making effective the adjustment in rank performed at the time of day of minimum demand, because in some instances there will be no change in at least one of the data movers assigned to service a movie having its rank changed to the next higher or lower rank. For example, when there is a change in rank of a movie so that a movie previously serviced by a first data mover will become serviced by a second data mover, there may be a movement of the movie from the local data mover cache of the first data mover to the local data mover cache of the second data mover. This process should be transparent to a client currently viewing the movie. However, if there are a large number of clients currently viewing the movie, the VCR functionality may be suspended for a brief moment during the time for the transfer of the movie between the caches, so that the video stream for each client currently viewing the movie is switched only once from the first data mover to the second data mover.

In many cases where the transfer of the movie occurs between a first data mover cache to a second data mover cache, the association of each movie ranking with a respective set of data movers offers the advantage that the transfer can occur over a dedicated link between the two data movers. For example, as shown in FIG. 1, the data movers are arranged in a series such that neighboring data movers in the series are coupled by a dedicated link 34, 35, etc. and the flow of movie data from one data mover to the next over a dedicated link permits the movie data from one data mover set servicing one movie ranking to be directly transferred to another data mover set servicing a next higher or lower movie ranking. In many cases the transfer will occur in this fashion because in the time span of one day the data mover set association of a movie is likely to change if at all from one data mover set to servicing one movie ranking to another data mover set servicing a next higher or lower ranking.

Figure 4:
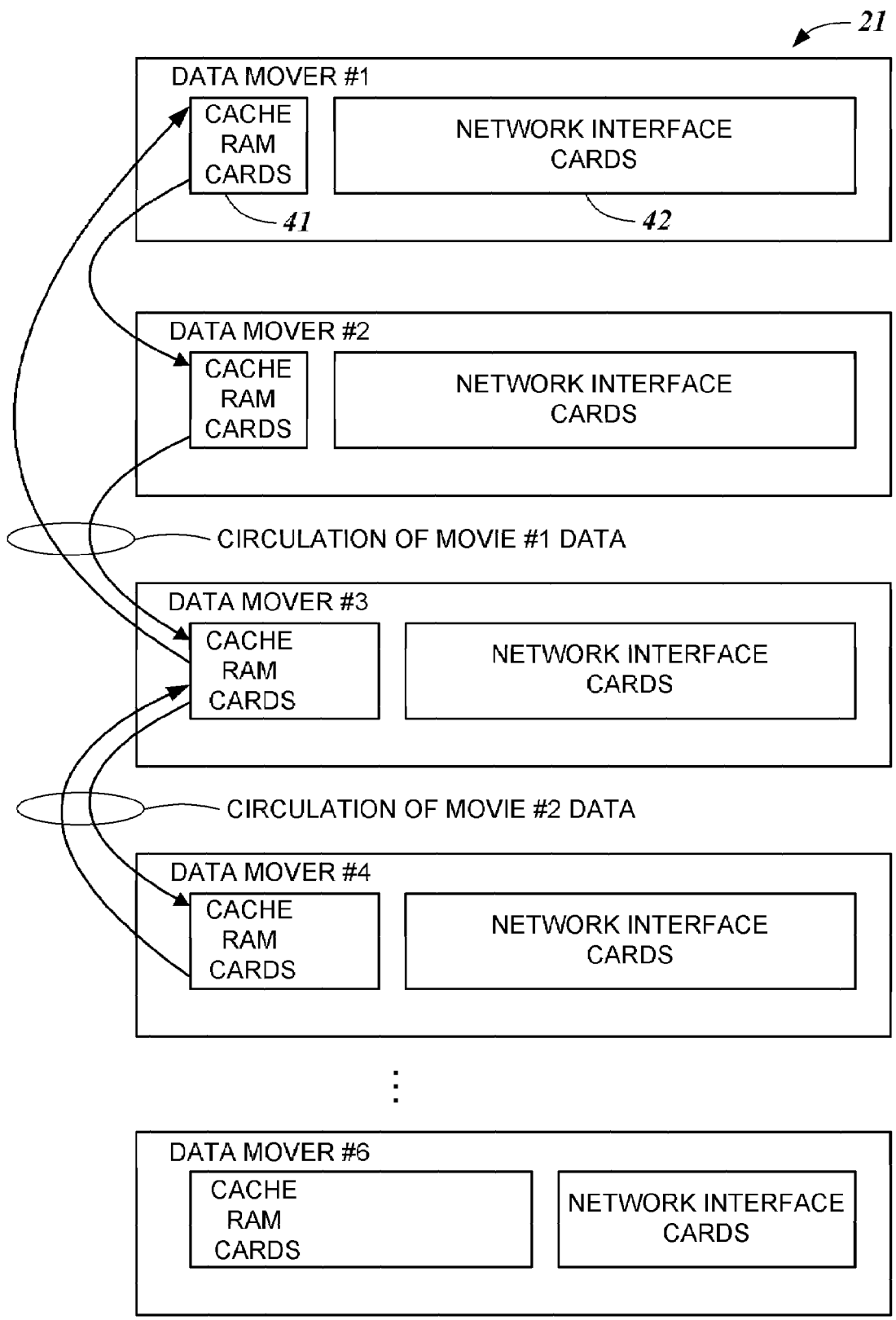
FIG. 4 shows an example of how the data movers are physically configured differently for providing client access to movies of respective ranks.

As shown in FIG. 4, the physical configuration of each of the data movers 21 depends on the rank of the movie or movies to be serviced by the data mover. In particular, the data movers servicing the higher ranking (i.e., the most popular) movies have fewer cache RAM cards 41 and more network interface cards 42 than the data movers servicing the lower ranking (i.e., less popular) movies. This is a consequence of the fact that the cache RAM has sufficiently high bandwidth that a large number of video streams can be serviced from one copy of a movie in the cache RAM. For less popular movies, not all of this bandwidth can be utilized, so that the ratio of network interface cards to cache RAM cards will fall for less popular movies.

For the most popular movies, there can be multiple data movers servicing just one movie, and in this case only a fraction of the cache RAM for servicing an entire movie need reside in any one of the movies. For example, as shown in FIG. 4, the movie data for movie #1 could be circulated among the first three data movers, and the movie data for movie #2 could be circulated among the third and fourth data movers. The data mover #1 could have a cache capacity to hold 40% of movie #1, the data mover #2 could have a cache capacity to hold 40% of movie #1, the data mover #3 could have a cache capacity to hold 25% of movie #1 and 40% of movie #2, and the data mover #4 could have a cache capacity to hold 65% of movie #2. Data mover #6 could have a cache capacity to hold at least 100% of movie #4.

FIG. 5 shows an example of a portion of the service database in the control station associating certain information with the movies. For each movie, the service database includes the movie ranking, the movie title, the frequency of access (in accesses per day), the data mover set for servicing client access to the movie, a certain number of streams reserved for accessing the movie, the number of active video streams from the movie, the location of the movie on disk, and any location of the movie in cache.

FIG. 6 shows an allocation of reserved and not reserved streams, and active and inactive streams from a data mover set. The programming of the video file server takes into account the fact that there may be certain times of day, such as 8 p.m. to 11 p.m., when the server cannot satisfy all requests for VOD service. This will be referred to as a peak demand situation. During the peak demand situation, VOD service is likely to be denied for the less popular movies, unless a less popular movie already happens to be in cache and being streamed to a fair number of clients. The reservation of a certain number of streams for servicing each movie prevents an allocation of streams prior to a high demand condition from becoming frozen during the high demand period. This can be a significant advantage if the demand for certain movies (such as adult films) has a tendency to rise, and the demand for certain other movies (such as family films) has a tendency to fall, during the peak demand period.

FIG. 7 shows an allocation of bandwidth on the storage system bus. The bandwidth is allocated for access of movies from the primary cache, or for access of movies from disk. The difference between the total available bus bandwidth and the allocated bandwidth is the free bandwidth.

FIG. 8 shows an allocation of primary cache memory capacity. A certain amount of the cache memory can be locked for access of one or more entire movies in the cache. The cache memory can also be locked for buffering of disk access. The difference between the total primary cache memory and the allocated cache memory is the free cache memory.

FIG. 9 shows a number of entire movies locked in the primary cache. Associated with each movie locked in the primary cache is a certain number of streams serviced from the movie in the cache. If the number of streams serviced from an entire movie in the primary cache falls below the number that can be serviced from disk, then it may be advantageous to service the streams from disk in order to free up cache memory for servicing a more popular movie from cache.

FIG. 10 shows various ways of indicating to a client the availability of movie titles during a high demand situation. The client may request the availability of a specified movie title. The client may also browse through a series of listing of groups of movies having varying degrees of availability. The first group includes the movies that are accessible to start at any time with full VCR functionality. The next series of groups are movies that are multicast from disk without VCR capability, starting at periodic increments of time, such as in the next 15 minutes, 30 minutes, etc. Then there is a group of movies that are already playing, from which could be spawned an additional stream to the client. For example, when the high-demand situation is reached, VCR functionality for popular movies not in cache is suspended in order to create the multi-cast streams spaced at periodic intervals in time.

Figure 11:
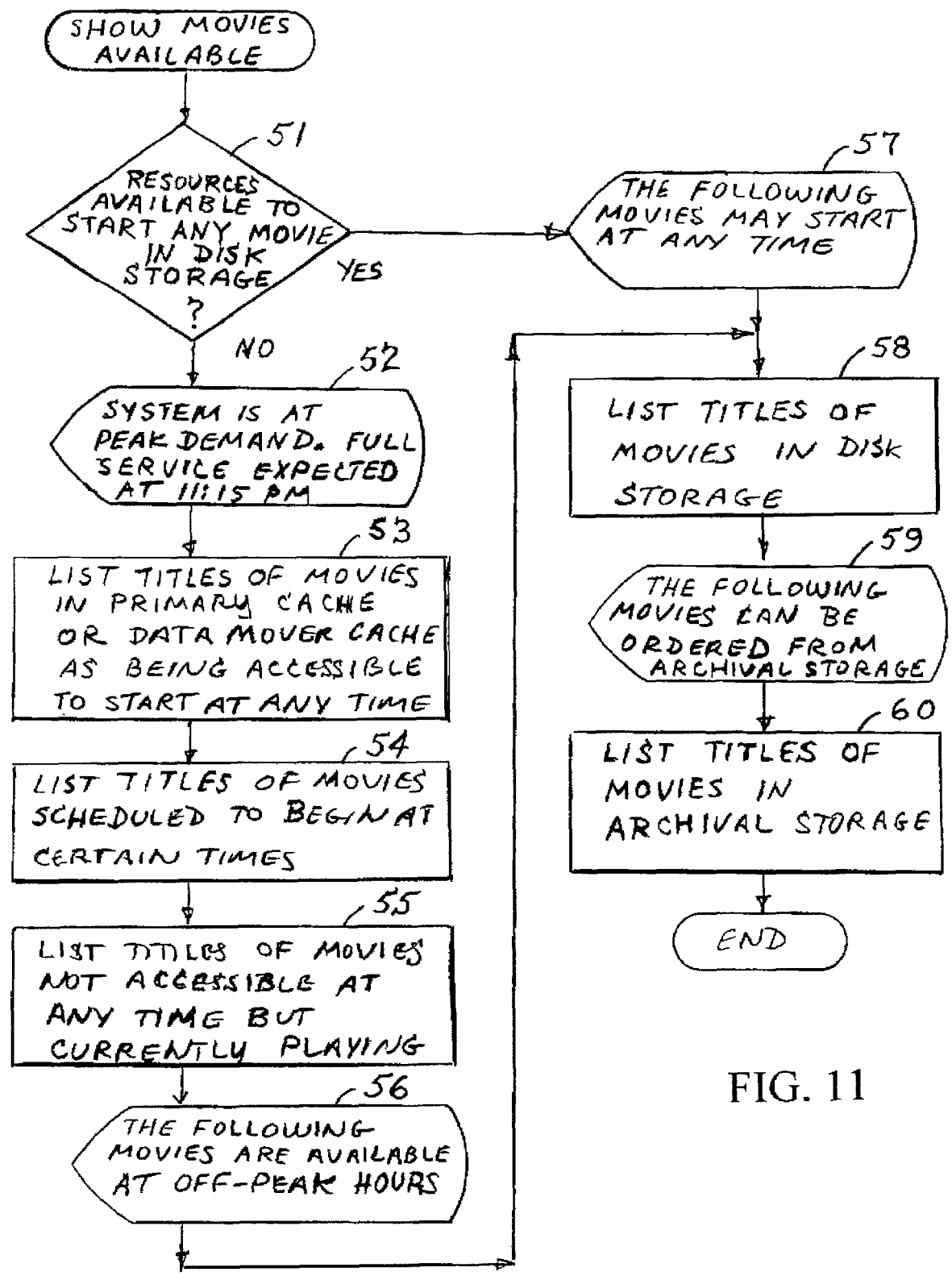
FIG. 11 is a flowchart showing how movie availability is indicated to a client.
Figure 12:
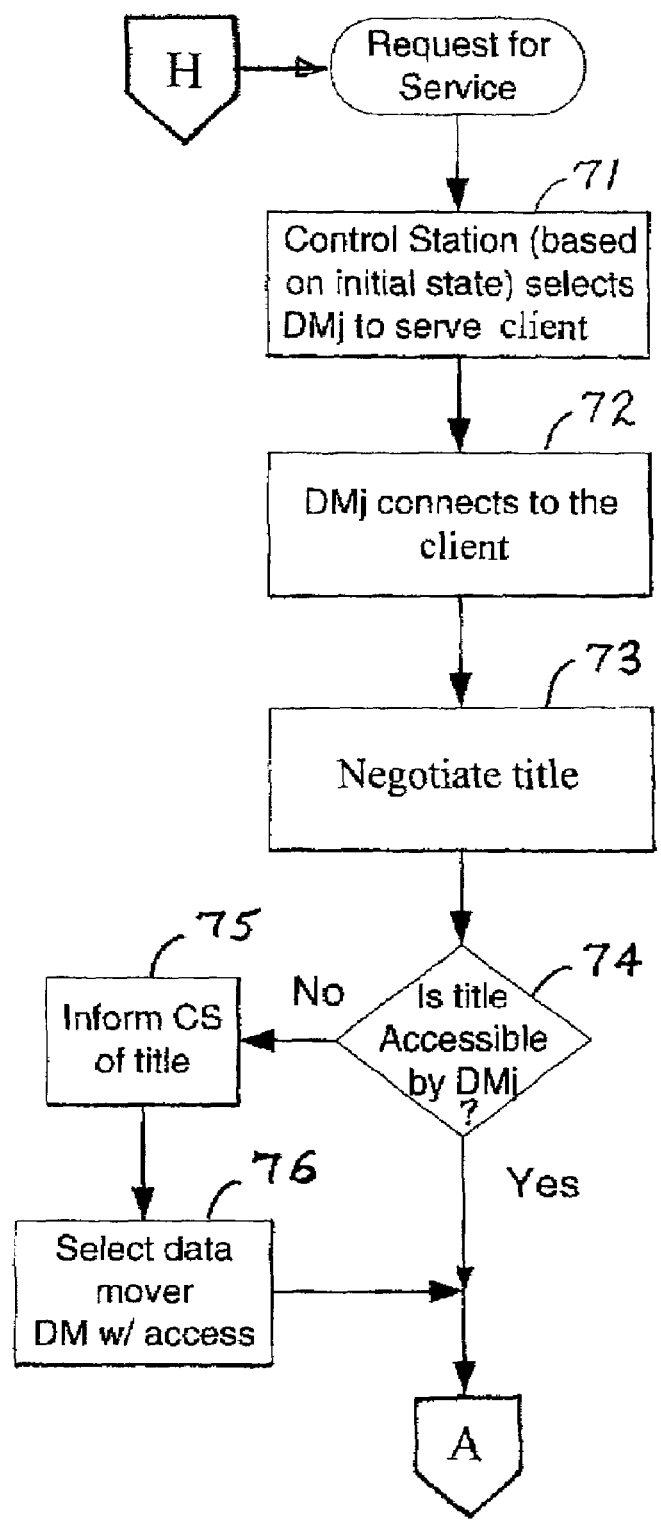
FIGS. 12 to 20 comprise pages of a flowchart showing how the video file server of FIG. 1 is programmed to respond to a client's request for video service.

FIG. 11 is a flowchart showing how movie availability is indicated to a client. In a first step 51, execution continues to step 52 if resources are not available to start immediately a new stream from any movie in disk storage. In step 52, the client is told that the system is at peak demand, and full service is expected at a particular time in the future. In step 53, the client is shown a list of titles of movies in cache that are accessible to start at any time. In step 54, the client is shown a list of titles of movies that are scheduled to begin at certain times. In step 55, the client is shown a list of titles of movies that are not accessible at any time but are currently playing. In step 56, the client is told that the following movies are available during off-peak hours. Then in step 58, the client is shown a list of titles of movies in disk storage. In step 59, the client is told that the following movies can be ordered from archival storage. In step 60, the client is shown a list of titles of movies in archival storage.

In step 51, if resources are available to start any movie in disk storage, then execution branches from step 51 to step 57. In step 57, the client is told that the following movies may start at any time. Execution then continues to step 58.

FIGS. 12 to 20 comprise pages of a flowchart showing how the video file server of FIG. 1 is programmed to respond to a client's request for video service. This request is received by the control station (22 in FIG. 1). In a first step 71, the control station (based on initial state in the service data base 32 in FIG. 1) selects a data mover DMj to serve the client. The control station sends a message over the high-speed serial bus (31 in FIG. 1) requesting DMj to respond to the client request. Then in step 72, the data mover DMj connects to the client. In step 73, the client negotiates a movie title with the data mover DMj, for example, as described above with reference to FIGS. 10 and 11, so that the data mover DMj obtains from the client a title of a movie that has been placed in disk storage. In step 74, the data mover DMJ checks whether it has access to the movie. For example, DMj must be in the set of data movers assigned to service the rank of the movie. It is also possible that DMj is in the set of data movers assigned to service the rank of the movie but the movie should be serviced by another one of the data movers in the set, for example, because the portion of the movie to be initially accessed presently resides in the local cache of another one of the data movers in the set. If the titled movie is not accessible by the data mover DMJ, then execution branches to step 75. In step 75, DMj informs the control station (CS) of the movie title. Then in step 76, the control station selects a data mover having access to the titled movie, and this selected data mover will be referenced as DMj in subsequent steps. Execution then continues to FIG. 13. Execution also continues to FIG. 13 from step 74 if the title is accessible by DMj.

Figure 13:
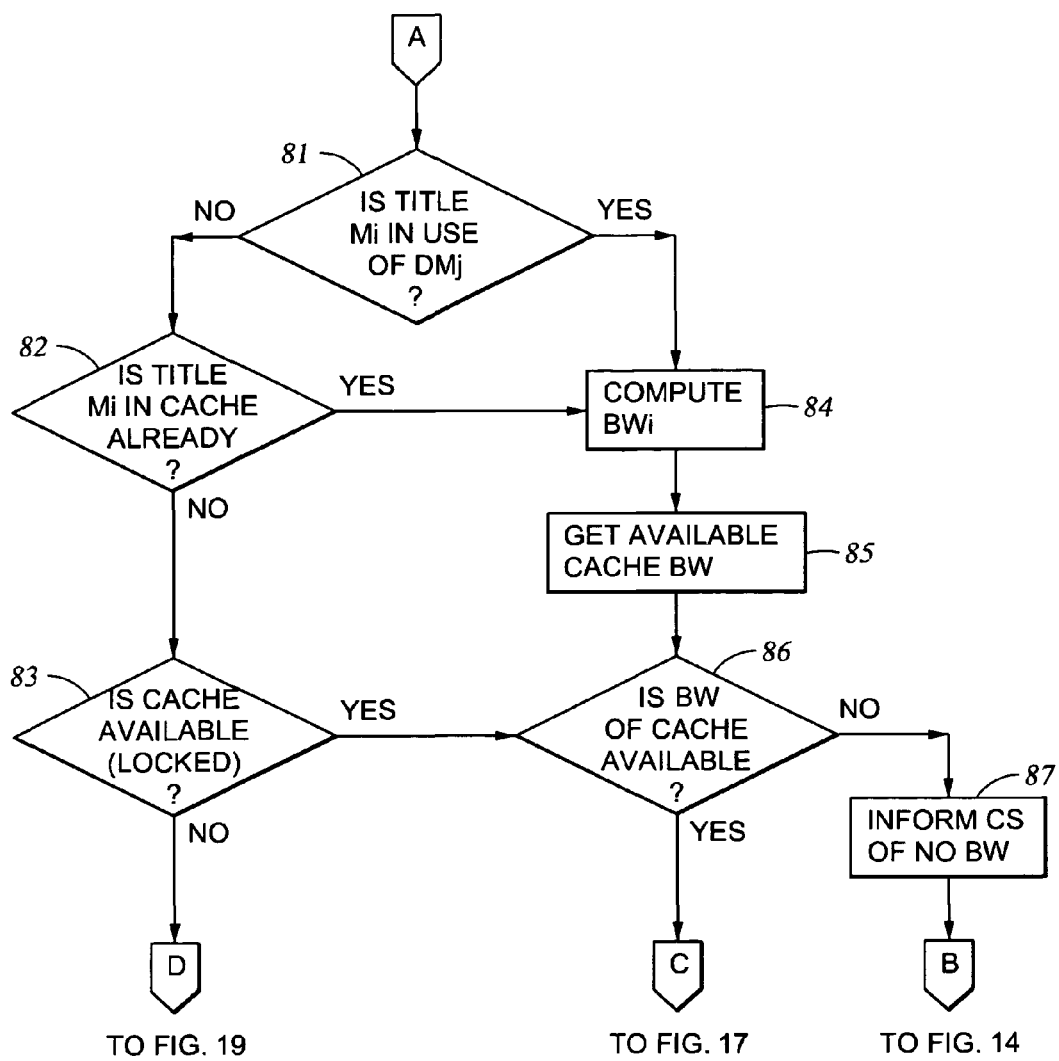

In FIG. 13, in step 81, execution branches depending on whether or not DMj is already servicing a stream from the titled movie Mi. If not, execution branches to step 82. In step 82, execution branches depending on whether or not the titled movie Mi is in the primary cache already. If not, then execution continues to step 83. In step 83, execution branches depending on whether or not there is cache available for the entire movie Mi. If not, execution continues to FIG. 19. Otherwise, execution branches to step 86. In step 86, execution branches to FIG. 17 if primary cache bandwidth is available for servicing the movie from the primary cache. If so, execution continues to FIG. 17. If not, execution branches to step 87 to inform the control station of the lack of primary cache bandwidth.

In step 81, if the data mover DMj is already servicing a stream from the movie, then execution continues to step 84. Execution also continues to step 84 from step 82 if the title Mi is already in the primary cache. In step 84, the required bandwidth for a new stream (BWi) is computed, and for comparison, in step 85 the available (i.e., free) primary cache bandwidth (BW) is obtained. Execution then continues in step 86.

Figure 14:
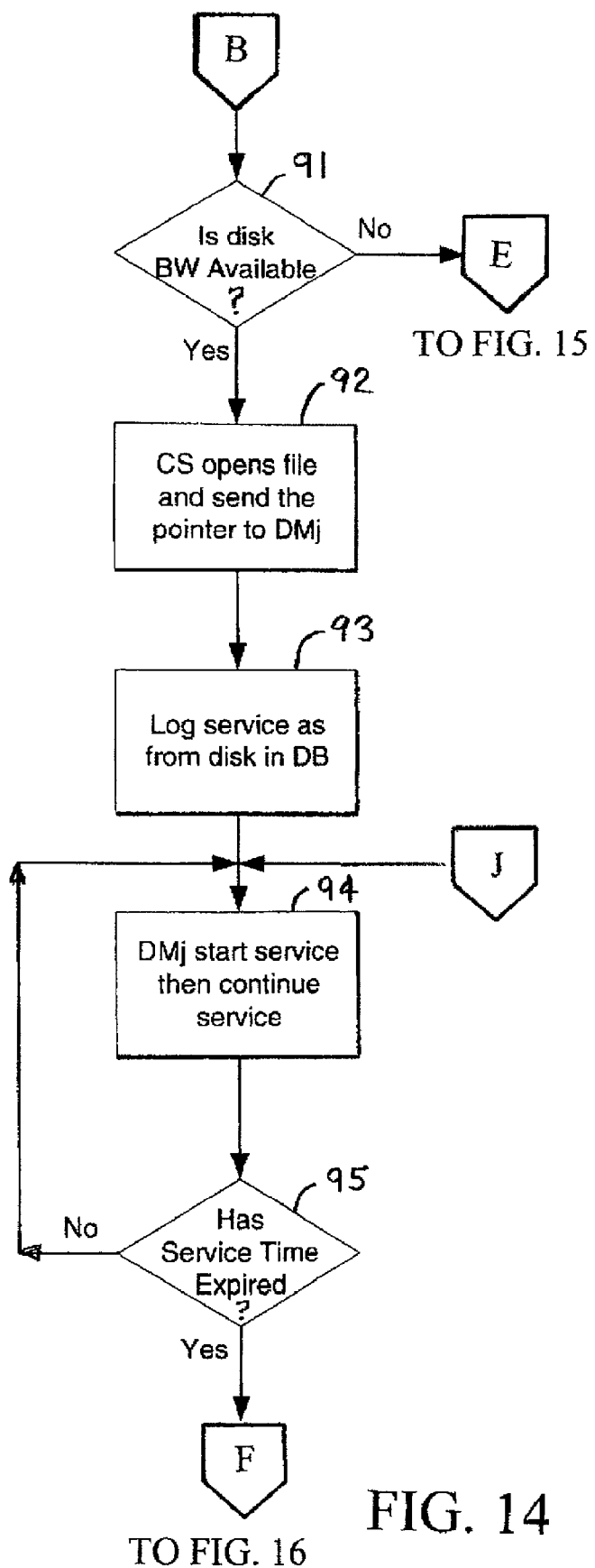
Figure 15:
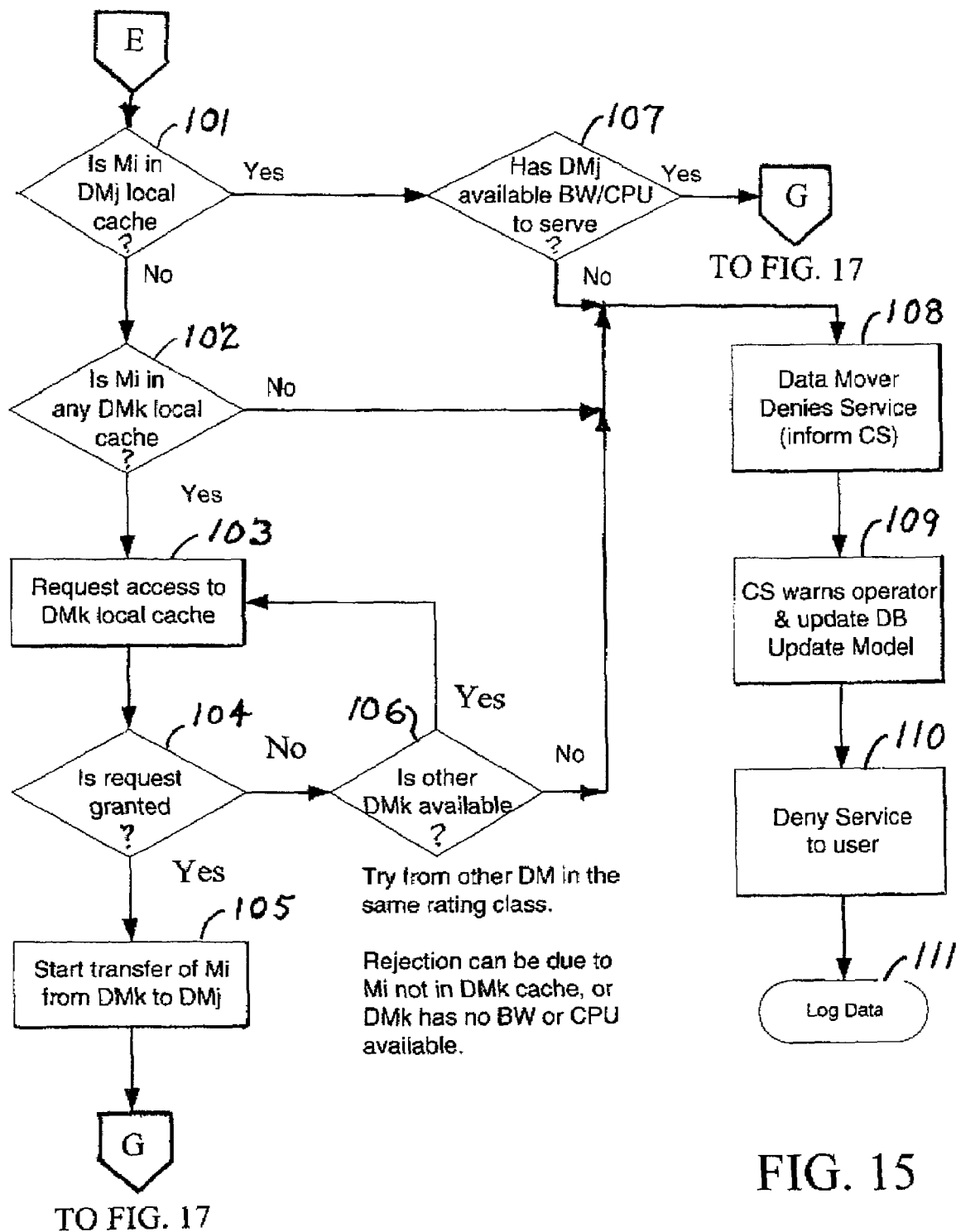

With reference to FIG. 14, in step 91, if disk bandwidth is not available, execution branches to FIG. 15. Otherwise, execution continues to step 92. In step 92, the control station opens the file for the movie Mi and sends a pointer to the file to the data mover DMj. Then in step 93, the control station logs in the service data base (DB) the fact that a stream for the movie Mi is being serviced from disk. In step 94, the data mover DMj starts service and continues service, until in step 95 the service time has expired. Once the service time has expired, execution continues to FIG. 16.

With reference to FIG. 15, in step 101, if the movie Mi is not in the data mover DMj local cache, execution continues to step 102. In step 102, if the movie Mi is in the local cache of any other data mover DMk, then execution continues to step 103. In step 103, the data mover DMj requests access to the local cache of the data mover DMk. In step 104, if the request is granted, execution continues to step 105, to start transfer of the movie Mi from the data mover DMk to the data mover DMj. Execution continues from step 105 to FIG. 17.

In step 104, if the request for access to the local cache of the data mover DMk is not granted, execution continues to step 106. In step 106, execution loops back to step 103 if there is another data mover DMk in the data set for the ranking of the movie Mi.

In step 101, if the movie Mi is in the local cache of the data mover DMj, then execution branches to step 107. In step 107, if the data mover DMj has available bandwidth (BW) and processor (CPU) resources to service the movie, then execution continues to FIG. 17. Otherwise, execution continues to step 108. Execution also continues to step 108 from step 102 if the movie Mi is not in the local cache of any other data mover, and to step 108 from step 106 if no other data mover DMk is available for servicing the movie. In step 108, the data mover denies service by informing the control station (CS) that service cannot be provided. In step 109, the control station (CS) warns an operator of the denial of service condition, and updates a model of the availability of service in the service database (DB). Then in step 110, the control station returns a denial of service message to the user. Then in step 111, the control station logs the denial of service event. The log, for example, is periodically inspected to adjust the allocation of data movers to each movie ranking in order to improve overall service, or to determine what additional resources would be needed to improve service.

Figure 16:
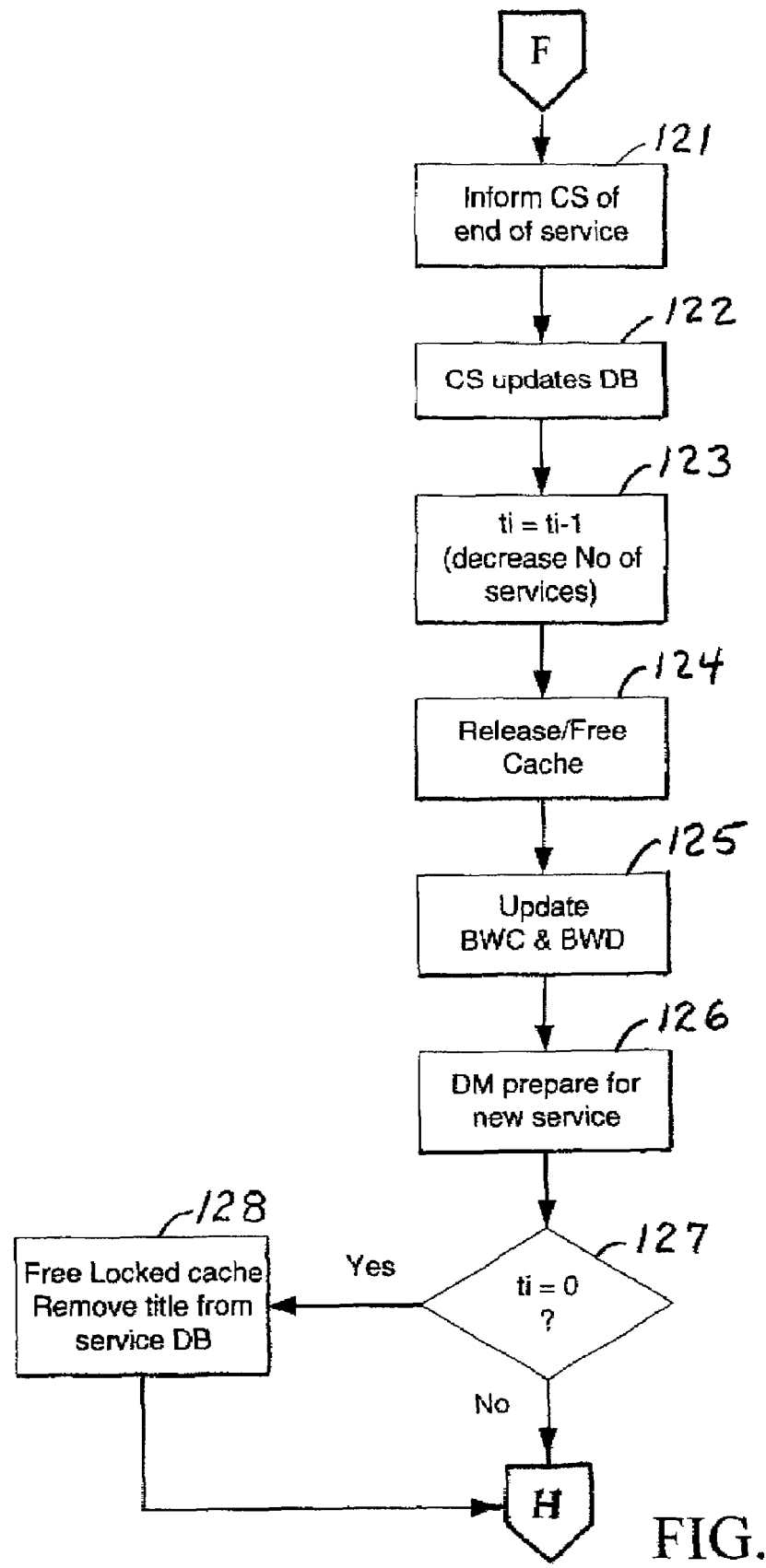

With reference to FIG. 16, in step 121, the data mover DMj informs the control station (CS) of the end of service. In step 122, the control station updates the service database (DB) so that the service to the client is no longer indicated. In step 123, the number of services (ti) for the movie Mi from the primary cache is decremented by one. In step 124, the cache supporting the stream is released or freed. In step 125, the bandwidth of the cache and the bandwidth of the disk are updated to indicate that the bandwidth no longer needed for servicing the stream has become free. In step 126, the data mover (DM) prepares for new service. In step 127, if the number of streams (ti) serviced from the entire movie Mi in the primary cache is not zero, then execution loops back to FIG. 12 to service another client request. Otherwise, if the number of streams (ti) is zero, then execution branches from step 127 to step 128 to free the locked primary cache allocated to the entire movie Mi and to update the service data base (DB) to indicate that the movie Mi is no longer in the primary cache. Execution continues from step 128 to FIG. 12 to service another client request.

Figure 17:
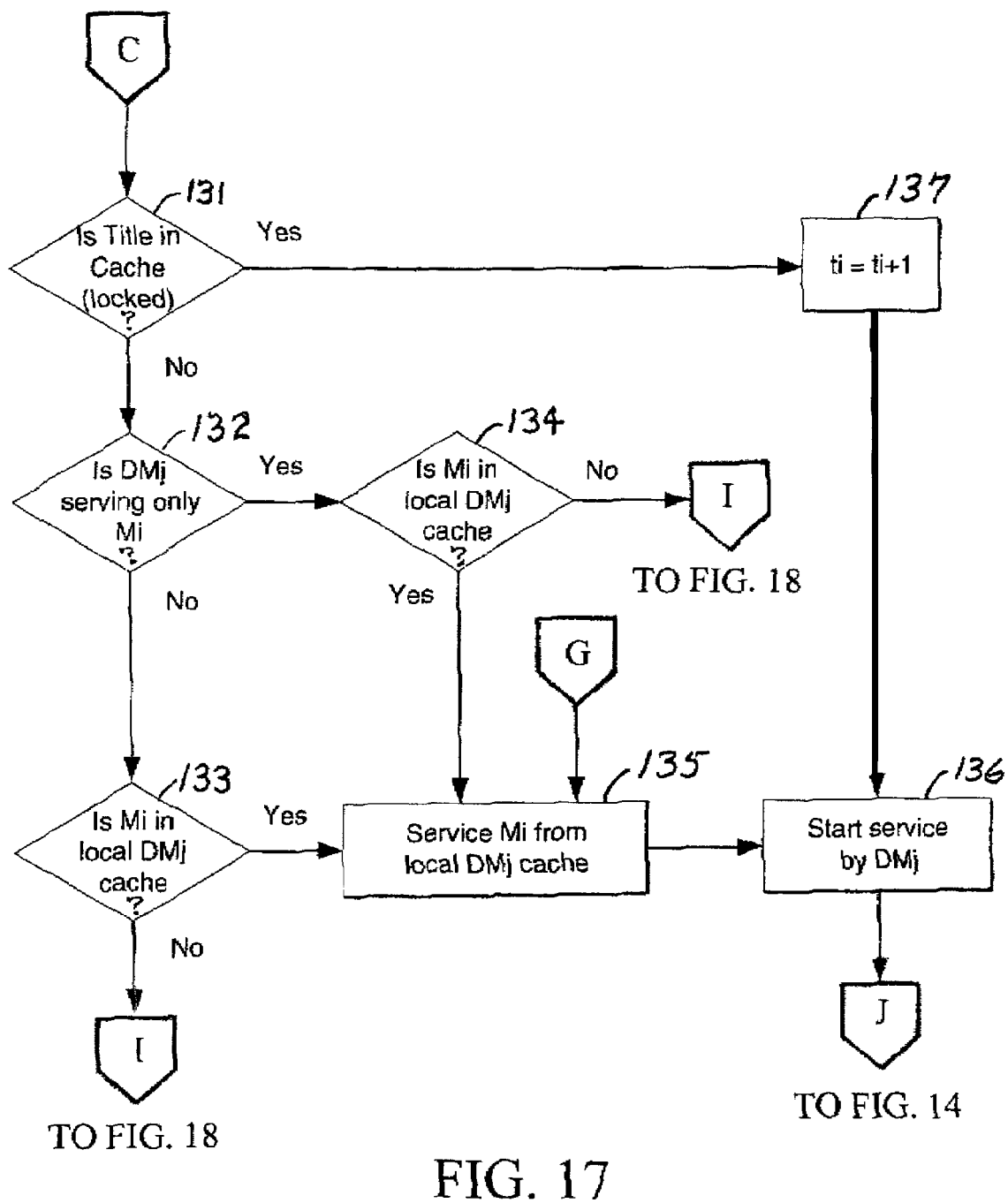

With reference to FIG. 17, in step 131, execution continues to step 132 if the entire movie Mi is not locked in the primary cache. In step 132, execution continues to step 133 if the data mover DMj is servicing only the movie Mi. In step 133, if the movie Mi is not in the local cache of the data mover DMj, then execution continues to FIG. 18.

In step 132, if the data mover DMj is serving only the movie Mi, then execution continues to step 134. In step 134, if the movie Mi is not in the local cache of the data mover DMj, then execution continues to FIG. 18. Otherwise, execution continues from step 134 to step 135. Execution also branches from step 133 to step 135 when the movie Mi is in the local cache of the data mover DMj. In step 135, preparations are made to service the movie Mi from the local cache of the data mover DMj, and the data mover DMj starts the stream in step 136. Execution continues from step 136 to FIG. 14.

In step 131, if the entire movie Mi is in locked primary cache, then execution branches to step 137. In step 137, the number of streams (ti) of the movie Mi serviced from the primary cache is incremented by one. Execution continues from step 137 to step 136.

Figure 18:
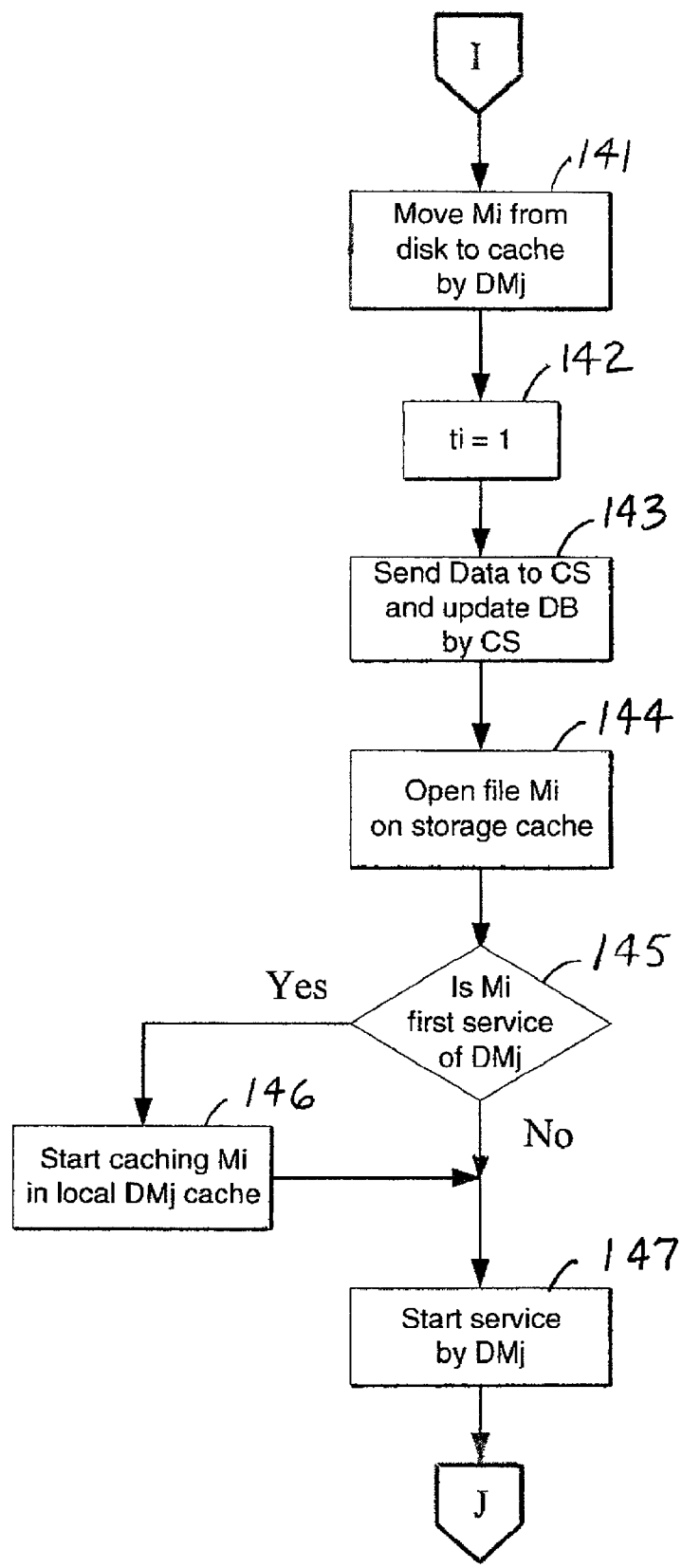

With reference to FIG. 18, in step 141, the data mover DMj moves the movie Mi from disk to primary cache by sending a pre-fetch command to the cached disk storage system. In step 142, the number of streams (ti) for the movie Mi is set to one. In step 143, the data mover DMj sends data to the control station (CS) for updating the service data base (DB) to indicate that the primary cache has been locked for storage of the movie Mi in the primary cache. In step 144, the data mover DMj opens the file on the primary cache, to begin reading movie data from the primary cache. In step 145, execution branches to step 146 if the movie Mi is the first service of the data mover DMj. In this case, there will be sufficient free local cache memory in the data mover DMj to store the entire movie Mi. In step 146, the data mover DMj starts caching the movie Mi in its local cache. Execution continues from step 146 to step 147. Execution also continues to step 147 from step 145 when Mi is not the first service of the data mover DMj. In step 147, the data mover DMj starts service of a video stream from the movie Mi, and execution continues to FIG. 14.

Figure 19:
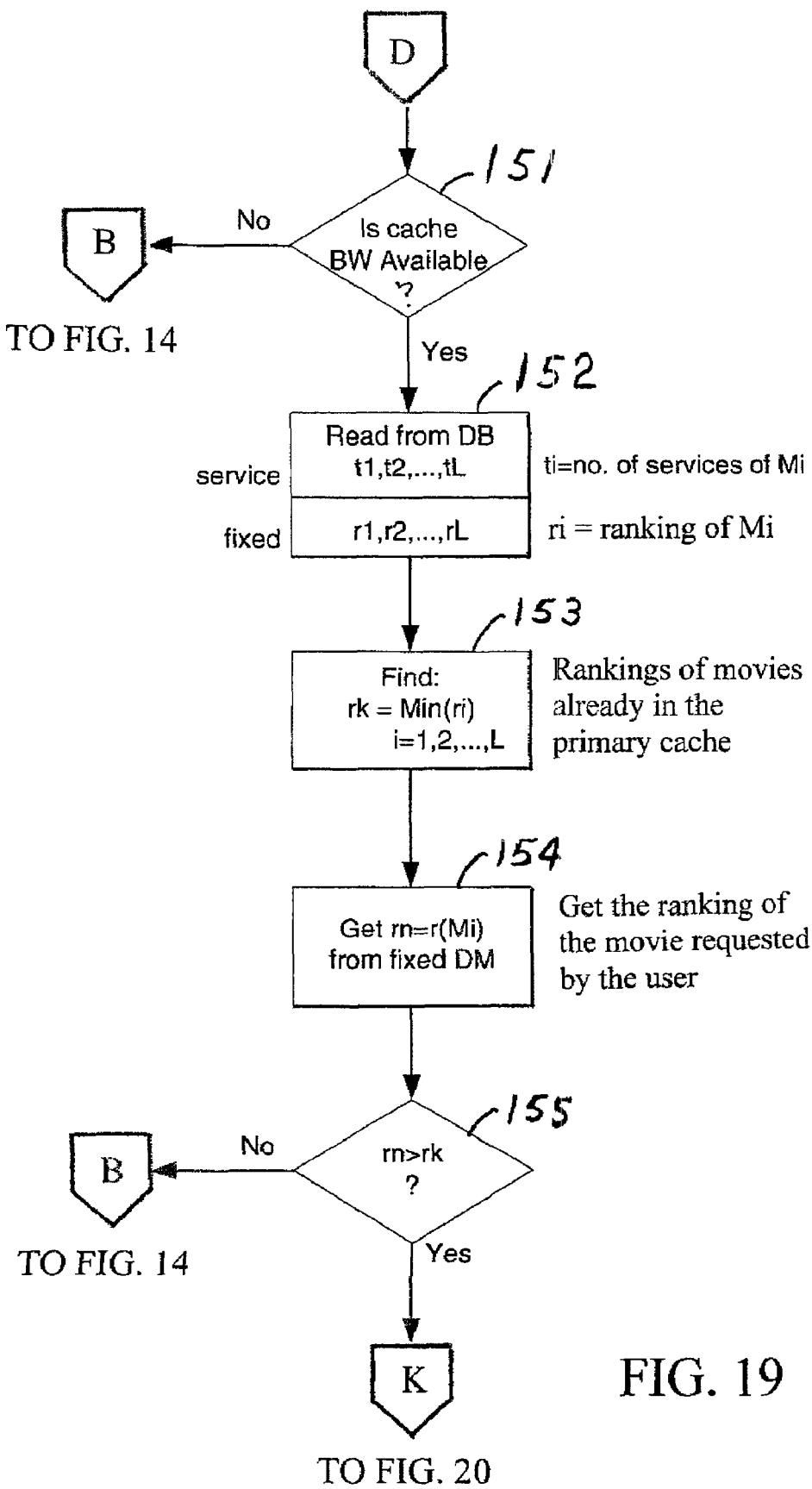

With reference to FIG. 19, in step 151, if cache bandwidth (BW) is not available, execution branches to FIG. 14. If cache bandwidth (BW) is available, execution continues to step 152. In step 152, the service data base (DB) is read to obtain the number of services or streams ti of the movies Mi in the primary cache and the respective rankings of these movies in cache. From these rankings, in step 153, the ranking of the lowest ranking (i.e., the least popular) movie is found that is already in the primary cache. In step 154, the ranking of the requested movie Mi is obtained, for example, from a fixed one of the data movers assigned to service the movie. In step 155, if the ranking of the requested movie is not greater than the ranking of the lowest ranking movie in the primary cache (i.e., the requested movie is less popular than the least popular movie in the primary cache), then execution branches to FIG. 14. Otherwise, execution continues to FIG. 20.

Figure 20:
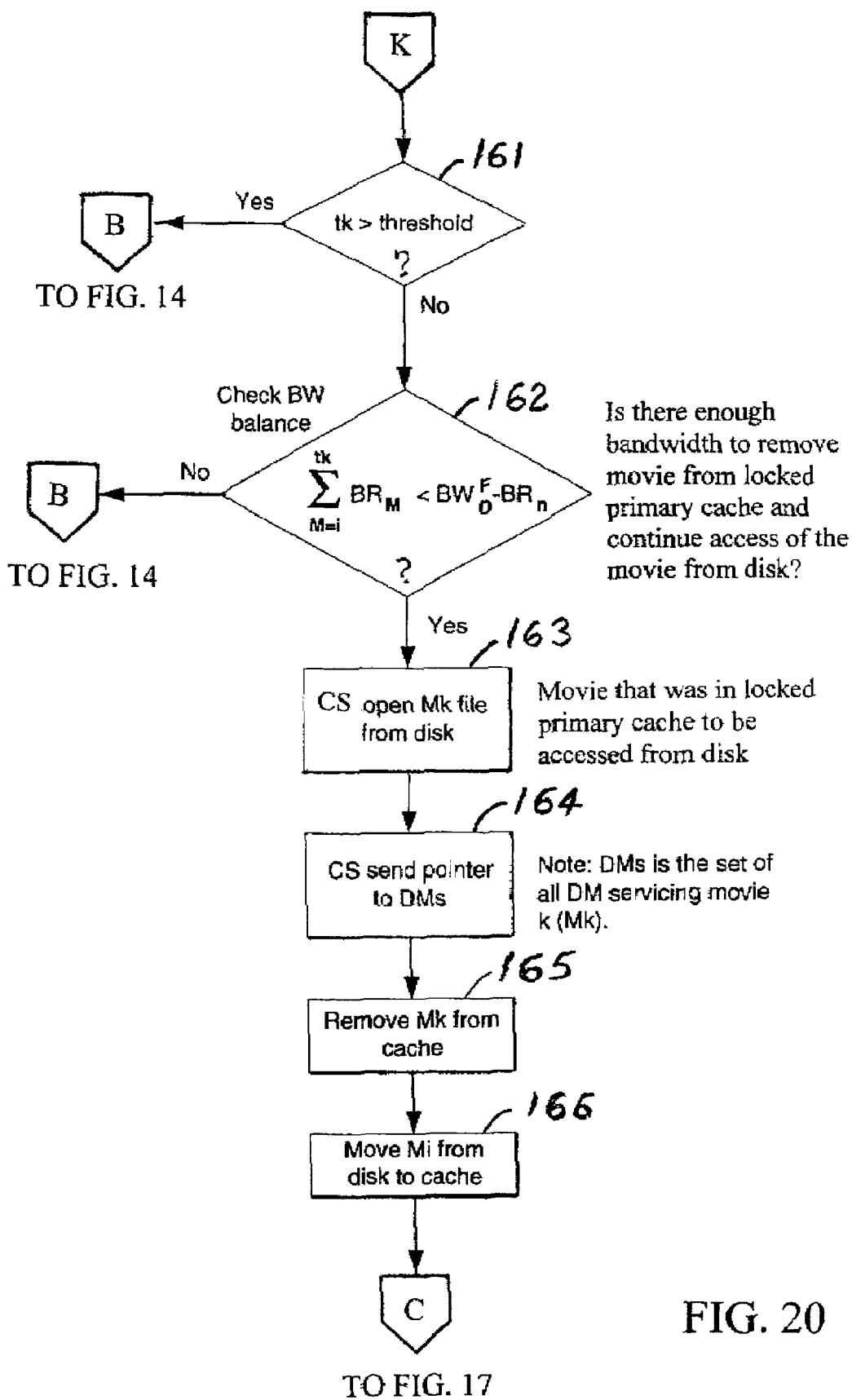

With reference to FIG. 20, in step 161, if the number of streams (tk) for the lowest ranking (i.e., least popular) movie in the primary cache is greater than a threshold, then execution continues to FIG. 14. In this case, it would be too disruptive to move the origination of the streams from an entire movie in cache to the movie on disk. Otherwise, execution continues from step 161 to step 162. In step 162, execution branches to FIG. 14 if there is not enough bandwidth to remove the movie from locked primary cache and continue access of the movie from disk. This is done by comparing the sum of the bit rates for all of the streams from the lowest ranking (i.e., least popular) movie in the primary cache to the difference between the free disk bandwidth less the bit rate for the new stream. Otherwise, if there is enough bandwidth, execution continues to step 163. In step 163, the control station (CS) opens the file from disk for the movie Mk that was in the locked primary cache and is to be accessed from disk. In step 164, the control station (CS) sends a pointer to the data movers in the data mover set (DMs) servicing the movie Mk. In step 165, the movie Mk is removed from the primary cache. In step 166, the movie Mi is moved from disk to cache.

In view of the above, it should be apparent that the video file server provides efficient management of access to movies ranging from very popular movies to unpopular movies by physically configuring sets of data movers for associated movie rankings, by reserving data mover local cache resources for the most popular movies, reserving a certain number of streams for popular movies, by negotiating with a client for selection of available movie titles during peak demand when resources are not available to start any freely-selected movie in disk storage, and by managing disk bandwidth and primary and local cache memory and bandwidth resources for popular and unpopular movies. The assignment of resources to movie rankings may remain the same while the rankings of the movies are adjusted, for example, during off-peak hours. A movie locked in primary cache and providing a source for servicing a number of video streams may be demoted from primary cache to disk in favor of servicing one or more streams of a higher-ranking movie (as described above with reference to FIG. 20).

What is claimed is:

1. A video file server for providing clients with video-on-demand access to movies, the video file server comprising:
   a cached disk storage system including a primary cache and disk storage for storing the movies; and
   a multiplicity of data mover computers coupled to the cached disk storage system for streaming video data from the cached disk storage system to clients in a data network, each of the data mover computers having a local cache;
   wherein the movies are ranked with respect to popularity, and a respective set of the data movers are pre-assigned for servicing video streams for each movie ranking; and
   wherein the data movers in the respective sets of data movers are configured differently for providing more network interface resources for very popular movies and for providing more local cache memory resources for less popular movies.

2. The video file server as claimed in claim 1, wherein for very popular movies, the very popular movies are retained in their entirety in local cache of the data movers assigned to service the very popular movies.

3. The video file server as claimed in claim 1, wherein the sets of data movers include a set consisting of more than one data mover for servicing one very popular movie, a set consisting of one data mover for servicing only one movie, and a set consisting of one data mover for servicing a plurality of the movies.

4. The video file server as claimed in claim 1, wherein a series of at least some of the data movers include direct links for transfer of movie data from a data mover set servicing one movie ranking to a data mover set servicing a next higher movie ranking and for transfer of movie data from the data mover set servicing the one movie ranking to a data mover set servicing a next lower movie ranking.

5. The video file server as claimed in claim 1, wherein data mover resources for a certain number of video streams from the data movers to the clients are reserved for each of a multiplicity of the movies.

6. The video file server as claimed in claim 1, wherein the video file server is programmed for locking in the primary cache a plurality of entire movies, and when there is a need for servicing a more popular movie from the primary cache and there is insufficient free cache memory for servicing the more popular movie from the primary cache, transferring the servicing of a less popular movie from the primary cache to disk storage in order to free cache memory for servicing the more popular movie from the primary cache.

7. The video file server as claimed in claim 6, wherein the video file server is programmed for freeing primary cache memory by transferring the servicing of a least popular movie in the primary cache from the primary cache to the disk storage so long as no more than a certain number of video streams are being serviced concurrently from the least popular movie in the primary cache.

8. The video file server as claimed in claim 1, wherein the video file server is programmed for negotiating with a client for selection of an available movie during peak demand when resources are not available to select freely any movie in the disk storage for which a video stream can be started.

9. A video file server for providing clients with video-on-demand access to movies, the video file server comprising:
   a cached disk storage system including a cache and disk storage for storing the movies; and
   a multiplicity of data mover computers coupled to the cached disk storage system for streaming video data from the cached disk storage system to clients in a data network;
   wherein the video file server is programmed for locking in the cache a plurality of entire movies, and when there is a need for servicing a more popular movie from the cache and there is insufficient free cache memory for servicing the more popular movie from the cache, transferring the servicing of a less popular movie from the cache to disk storage in order to free cache memory for servicing the more popular movie from the cache,
   wherein each of the data mover computers has a local cache, the movies are ranked with respect to popularity, and a respective set of the data movers are pre-assigned for servicing video streams for each movie ranking, and the data movers in the respective sets of data movers are configured differently for providing more network interface resources for very popular movies and for providing more local cache memory resources for less popular movies.

10. The video file server as claimed in claim 9, wherein the video file server is programmed for freeing locked cache memory by transferring the servicing of the least popular movie in the cache from the cache to the disk storage so long as no more than a certain number of video streams are being concurrently serviced from the least popular movie in the cache.

11. The video file server as claimed in claim 9, wherein a series of at least some of the data movers include direct dedicated links for transfer of movie data from a data mover set servicing one movie ranking to a data mover set servicing a next higher movie ranking and for transfer of movie data from the data mover set servicing the one movie ranking to the data mover set servicing a next lower movie ranking.

12. The video file server as claimed in claim 9, wherein data mover resources for a certain number of video streams from the data movers to the clients are reserved for each of a multiplicity of the movies.

13. A method of operating a video file server for providing clients with video-on-demand access to movies, the video file server having a cached disk storage system including a primary cache and disk storage containing the movies, and a multiplicity of data mover computers coupled to the cached disk storage system for streaming video data from the cached disk storage system to clients in a data network, each of the data mover computers having a local cache, wherein the method includes:
  ranking the movies with respect to popularity, and assigning a respective set of the data movers to each movie ranking, and
  servicing video streams for each movie ranking with the respective set of data movers assigned for servicing said video streams for said each movie ranking; and
  which includes configuring differently the data movers in the respective sets of data movers in order to provide more network interface resources for very popular movies and for providing more local cache memory resources for less popular movies.

14. The method as claimed in claim 13, which includes, for very popular movies, retaining the very popular movies in their entirety in the local cache of the data movers assigned to service the very popular movies.

15. The method as claimed in claim 13, which includes servicing a most popular movie with an assigned data mover set consisting of more than one data mover, servicing only one movie with an assigned data mover set consisting of one data mover, and servicing a plurality of movies with an assigned data mover set consisting of one data mover.

16. The method as claimed in claim 13, wherein a series of at least some of the data movers are linked by direct dedicated data links and the method includes transferring movie data from a data mover set servicing one movie ranking to a data mover set servicing a next higher movie ranking and transferring movie data from a data mover set servicing the one movie ranking to a data mover set servicing a next lower movie ranking.

17. The method as claimed in claim 13, which includes reserving data mover resources for a respective number of video streams from the data movers to the clients for each of a multiplicity of the movies.

18. The method as claimed in claim 13, which includes locking in the primary cache a plurality of entire movies, and when there is a need for servicing a more popular movie from the primary cache and there is insufficient free cache memory for servicing the more popular movie from the primary cache, transferring the servicing of a less popular movie from the primary cache to the disk storage in order to free primary cache memory for servicing the more popular movie from the primary cache.

19. The method as claimed in claim 13, which includes freeing primary cache memory by transferring the servicing of a least popular movie in the primary cache from the primary cache to the disk storage so long as no more than a certain number of video streams are being concurrently serviced from the least popular movie in the primary cache.

20. The method as claimed in claim 13, which includes the video file server negotiating with a client for selection of an available movie during peak demand when resources are not available to select freely any movie in the disk storage for which a video stream can be started.

21. A method of operating a video file server for providing clients with video-on-demand access to movies, the video file server having a cached disk storage system including a cache and disk storage containing the movies, and a multiplicity of data mover computers coupled to the cached disk storage system for streaming video data from the cached disk storage system to clients in a client data network, the method comprising:
  locking in the cache a plurality of entire movies, and when there is a need for servicing a more popular movie from the cache and there is insufficient free cache memory for servicing the more popular movie from the cache, transferring the servicing of a less popular movie from the cache to the disk storage in order to free cache memory for servicing the more popular movie from the cache,
  wherein each of the data mover computers has a local cache, the method includes ranking the movies with respect to popularity, assigning a respective set of the data movers for servicing video streams for each movie ranking, and configuring the data movers in the respective sets of data movers differently for providing more network interface resources for very popular movies and for providing more local cache memory resources for less popular movies.

22. The method as claimed in claim 21, which includes the video file server freeing locked cache memory by transferring the servicing of a least popular movie in the cache from the cache to the disk storage so long as no more than a certain number of video streams are being concurrently serviced from the least popular movie in the cache.

* * * * *